United States Patent
Hackenjos et al.

(10) Patent No.: US 10,839,087 B2
(45) Date of Patent: Nov. 17, 2020

(54) SECURE DATA AGGREGATION IN DATABASES USING DYNAMIC BUCKETIZATION AND GROUPING BUCKETIZATION

(71) Applicant: SAP SE, Walldorf (DE)

(72) Inventors: Timon Hackenjos, St. Georgen (DE); Florian Hahn, Karlsruhe (DE); Florian Kerschbaum, Waterloo (CA)

(73) Assignee: SAP SE, Walldorf (DE)

(*) Notice: Subject to any disclaimer, the term of this patent is extended or adjusted under 35 U.S.C. 154(b) by 89 days.

(21) Appl. No.: 16/048,769

(22) Filed: Jul. 30, 2018

(65) Prior Publication Data
US 2020/0034547 A1 Jan. 30, 2020

(51) Int. Cl.
| | |
|---|---|
| H04L 29/06 | (2006.01) |
| G06F 21/30 | (2013.01) |
| G06F 21/60 | (2013.01) |
| G06F 16/28 | (2019.01) |

(52) U.S. Cl.
CPC .......... *G06F 21/602* (2013.01); *G06F 16/285* (2019.01); *H04L 63/0428* (2013.01)

(58) Field of Classification Search
CPC ....... G06F 21/60; G06F 12/14; G06F 2212/40
See application file for complete search history.

(56) References Cited

U.S. PATENT DOCUMENTS

| | | | |
|---|---|---|---|
| 6,381,601 B1* | 4/2002 | Fujiwara | G06F 16/24556 707/692 |
| 7,093,137 B1* | 8/2006 | Sato | G06F 21/6227 380/277 |
| 2009/0106310 A1* | 4/2009 | Lanza | G06F 40/18 |
| 2020/0034546 A1 | 1/2020 | Hackenjos et al. | |

OTHER PUBLICATIONS

Boneh, D. et al., "Evaluating 2-DNF formulas on ciphertexts," Theory of Cryptography Conference, TCC, 2005, pp. 325-341.
Curtmola, R. et al., "Searchable Symmetric Encryption: Improved Definitions and Efficient Constructions," Proceedings of the 13th ACM Conference on Computer and Communications Security, 2006, pp. 79-88.
Cash, D. et al., "Highly-Scalable Searchable Symmetric Encryption with Support for Boolean Queries," Advances in Cryptology, CRYPTO, Springer, 2013, pp. 353-373.
Cash, D. et al., "Dynamic Searchable Encryption in Very-Large Databases: Data Structures and Implementation," IACR Cryptology ePrint Archive, 2014, pp. 1-16.
(Continued)

*Primary Examiner* — Izunna Okeke
(74) *Attorney, Agent, or Firm* — Sterne, Kessler, Goldstein & Fox P.L.L.C.

(57) ABSTRACT

Disclosed herein are system, method, and computer program product embodiments for secure data aggregation in databases. An embodiment operates by identifying a value column and a group column of a plurality of columns of a dataset. Two distinct group values of the group column are identified. A first group value is replaced with a first substitute value, and a second group value is replaced with a second substitute value. A value of the value column of each of the plurality of records and the substitute values are encrypted. The plurality of encrypted records are uploaded to a server.

17 Claims, 13 Drawing Sheets

(56) References Cited

OTHER PUBLICATIONS

Fuller, B. et al., "Sok: Cryptographically Protected Database Search," arXiv preprint arXiv:1703.02014v2 [cs.CR], Jun. 2, 2017, 20 pages.
Grubbs, P. et al., "Leakage-Abuse Attacks against Order-Revealing Encryption," Cryptology ePrint Archive, Report 2016/895, 2016, printed from https://eprint.iacr.org/2016/895.pdf, 18 pages.
Ge, T. & Zdonik, S., "Answering Aggregation Queries in a Secure System Model," Proceedings of the 33rd International Conference on Very Large Data Bases, VLDB' 07, 2007, pp. 519-530.
Hacigümüš, H. et al., "Executing SQL over Encrypted Data in the Database-Service-Provider Model," Proceedings of the ACM SIGMOD Conference on Management of Data, SIGMOD '2002, pp. 216-227.
Hacigümüš, H. et al., "Providing Database as a Service," Proceedings of the 18th International Conference on Data Engineering (ICDE'02), 2002,.
Naveed, M. et al., "Inference Attacks on Property-Preserving Encrypted Databases," Proceedings of the 22nd ACM Conference on Computer and Communications Security, CCS'15, 2015, 13 pages.
Paillier, P. "Public-Key Cryptosystems Based on Composite Degree Residuosity Classes," EUROCRYPT'99, 1999, pp. 223-238.
Popa, R.A. et al., "ClyptDB: Protecting Confidentiality with Encrypted Query Processing, "Proceedings of the 23rd ACM Symposium on Operating Systems Principles, SOSP'11, 2011, pp. 1-16.
Song, D.X. et al., "Practical Techniques for Searches on Encrypted Data," Proceedings of the 2000 IEEE Symposium on Security and Privacy, 2000, 12 pages.

\* cited by examiner

| ID | Salary | Gender | Name | Department |
|---|---|---|---|---|
| 1 | 1000 | Male | Henry | Sales |
| 2 | 5000 | Female | Jessica | Sales |
| 3 | 1500 | Female | Alice | Finance |
| 4 | 3000 | Male | Bob | Sales |
| 5 | 2000 | Male | Paul | Facility |

SUM(Salary), Gender, Departmnet    From [Table 102A]

WHERE Department = "Sales" GROUP BY Gender;

| SUM (Salary) | Gender | Department |
|---|---|---|
| 5000 | Female | Sales |
| 4000 | Male | Sales |

| ID | E_Salary | E_Gender |
|---|---|---|
| 1 | [[1000]]⊕ | $Enc_{det}$ (male) |
| 2 | [[5000]]⊕ | $Enc_{det}$ (female) |
| 3 | [[1500]]⊕ | $Enc_{det}$ (female) |
| 4 | [[3000]]⊕ | $Enc_{det}$ (male) |
| 5 | [[2000]]⊕ | $Enc_{det}$ (male) |

| | Value | Group 1 | | Group 2 |
|---|---|---|---|---|
| ID | Salary | Gender | Name | Department |
| 1 | 1000 | Male | Henry | Sales |
| 2 | 5000 | Female | Jessica | Sales |
| 3 | 1500 | Female | Alice | Finance |
| 4 | 3000 | Male | Bob | Sales |
| 5 | 2000 | Male | Paul | Facility |

| Bucket | Rows |
|---|---|
| $Gen_1$ | 1,2,3,4,5 |
| $Dept_1$ | 1,2,3,4 |
| $Dept_2$ | 5 |

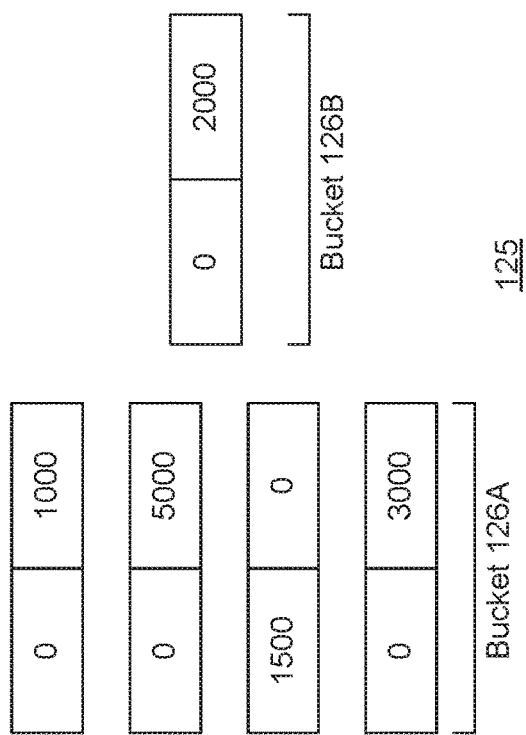

| ID | E_Salary | E_Gender | E_Department | E_Gender * E_Department |
|---|---|---|---|---|
| 1 | [[1000]]⊗⊕ | [[0]]⊗⊕ | [[0]]⊗⊕⊗⊕⊗⊕⊗⊕ | [[0]]⊗⊕⊗⊕⊗⊕⊗⊕ |
| 2 | [[5000]]⊗⊕ | [[1]]⊗⊕ | [[0]]⊗⊕⊗⊕⊗⊕⊗⊕ | [[0]]⊗⊕⊗⊕⊗⊕⊗⊕ |
| 3 | [[1500]]⊗⊕ | [[1]]⊗⊕ | [[1]]⊗⊕⊗⊕⊗⊕⊗⊕ | [[1]]⊗⊕⊗⊕⊗⊕⊗⊕ |
| 4 | [[3000]]⊗⊕ | [[0]]⊗⊕ | [[0]]⊗⊕⊗⊕⊗⊕⊗⊕ | [[0]]⊗⊕⊗⊕⊗⊕⊗⊕ |
| 5 | [[2000]]⊗⊕ | [[0]]⊗⊕ | [[0]]⊗⊕⊗⊕⊗⊕⊗⊕ | [[0]]⊗⊕⊗⊕⊗⊕⊗⊕ |

| 1500 | 5000 | 0 | 4000 | 132A |
|---|---|---|---|---|

(a) Bucket combination (Gen$_1$, Dept$_1$)

| 0 | 0 | 0 | 2000 | 132B |
|---|---|---|---|---|

(b) Bucket combination (Gen$_1$, Dept$_2$)

$$\begin{pmatrix} 1 & G_1 & G_2 & G_1 \cdot G_2 \\ 1 & 0 & 1 & 0 \\ 1 & 0 & 0 & 0 \\ 1 & 1 & 0 & 0 \\ 1 & 1 & 1 & 1 \end{pmatrix} \cdot \begin{pmatrix} a_0 \\ a_1 \\ a_2 \\ a_3 \end{pmatrix} = \begin{pmatrix} 1 \\ 2^{32} \\ 2^{64} \\ 2^{96} \end{pmatrix}$$

$$\underbrace{\phantom{XXXXXXXXXXXXXXXXXXXXXXXX}}_{134}$$

SELECT    SUM (Salary),    Gender, Departmnet

FROM example GROUP BY Gender, Department

| SUM (Salary) | Gender | Department |
|---|---|---|
| 4000 | Male | Sales |
| 5000 | Female | Sales |
| 1500 | Female | Finance |
| 2000 | Male | Facility |

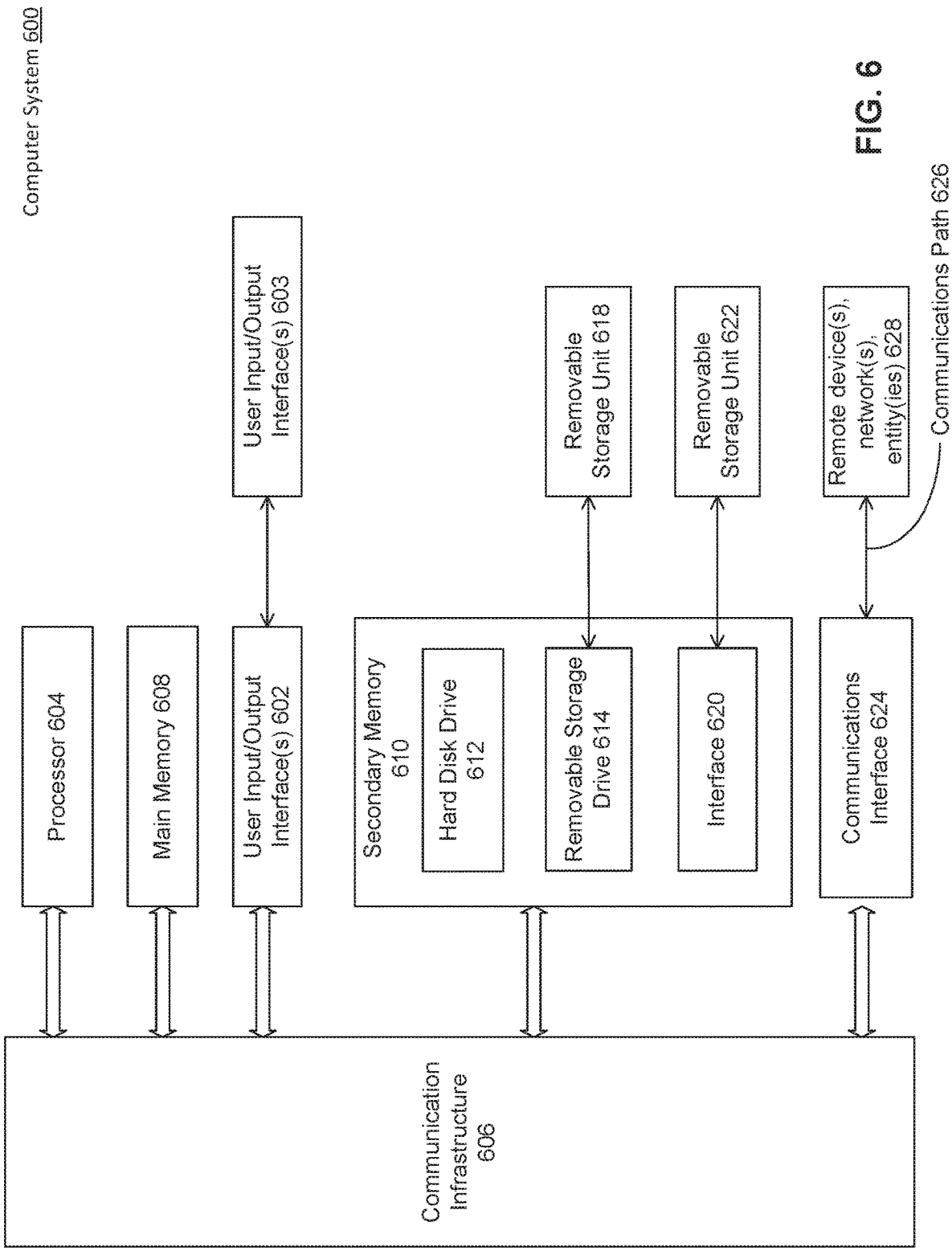

SECURE DATA AGGREGATION IN DATABASES USING DYNAMIC BUCKETIZATION AND GROUPING BUCKETIZATION

CROSS REFERENCE TO RELATED APPLICATIONS

This application is related to co-pending U.S. patent application Ser. No. 16/048,735, by Hackenjos et al. "Secure Data Aggregation in Databases Using Static Shifting and Shifted Bucketization," filed herewith which is hereby incorporated by reference in its entirety.

BACKGROUND

Grouping and data aggregation functionality allows users to obtain overviews and summaries of data. As the amount of data grows, the more important such functionality often becomes. Data warehousing can be costly and as such, data is often stored by third-party vendors. However, sensitive or confidential data being provided to these third party vendors should be encrypted to be protected.

While data may be encrypted using standard database encryption techniques before uploading to a shared or third-party server, one problem with encrypting data in such a manner is that the server is unable to perform any grouping or data aggregation functionality on the encrypted data. This inability to aggregate the data by the server can increase both bandwidth usage and transmission overhead in transmitting more data, and also increase the processing resources required by individual devices which may have to individually aggregate the received, non-aggregated datasets.

BRIEF DESCRIPTION OF THE DRAWINGS

The accompanying drawings are incorporated herein and form a part of the specification.

FIG. 6 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing secure data aggregation in databases using dynamic bucketization and grouping bucketization.

Figure 1A:
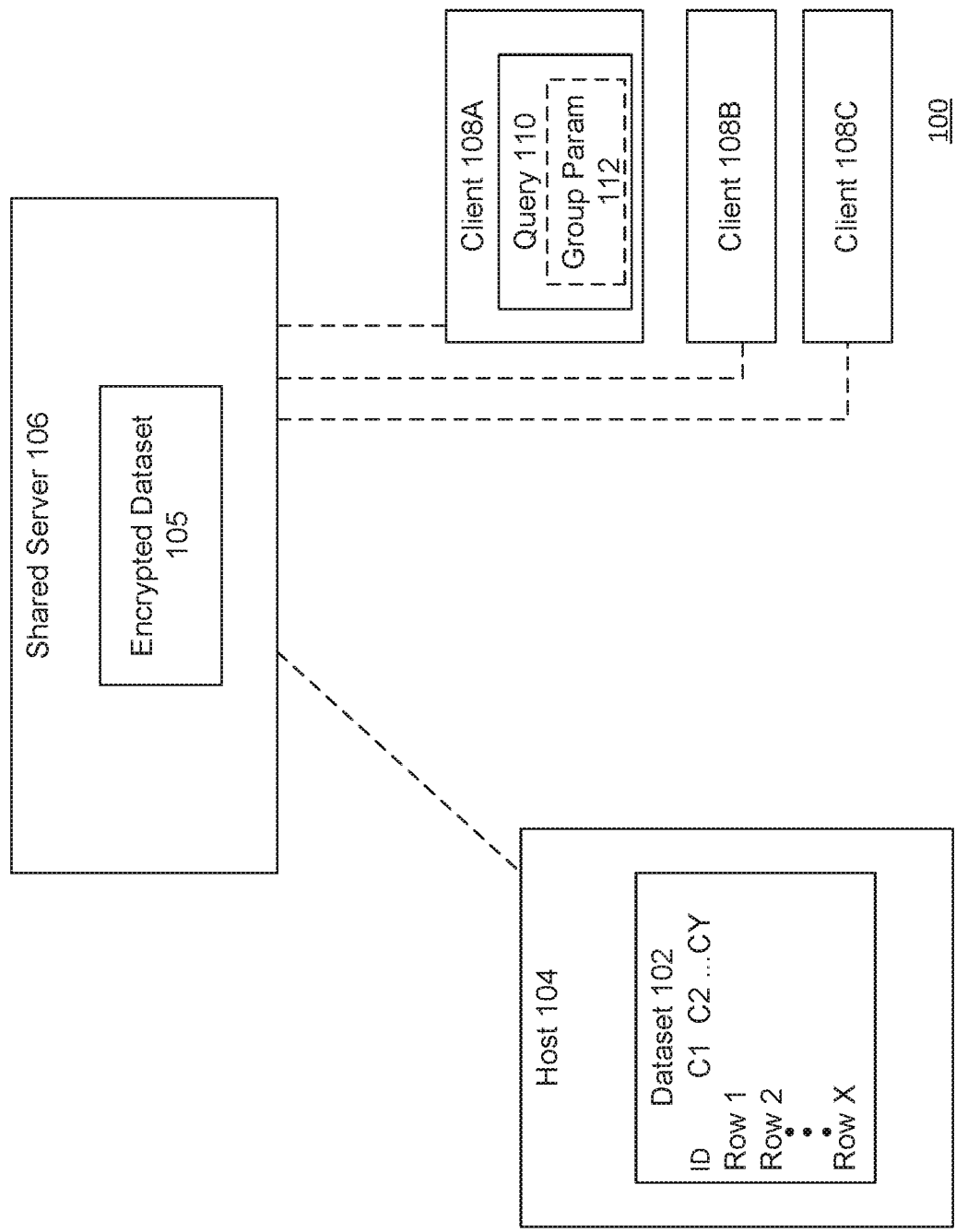
FIGS. 1A-1O are diagrams illustrating example functionality of a system for providing secure data aggregation in databases, according to some embodiments.

FIG. 1A is a block diagram illustrating example functionality of a system 100 for providing secure data aggregation in a database, according to some embodiments. In the example of FIG. 1A, a host computer 104 may receive or store an initial (unencrypted) dataset 102. Dataset 102 may include a plurality of records, organized into rows (rows 1-X) and columns (c1-cY). In an embodiment, dataset 102 may include multiple different tables of a database.

In an embodiment, host computer 104 may upload dataset 102 to a shared server 106. Shared server 106 may include any database system or server farm, including but not limited to interconnected servers forming a cloud computing system. Shared server 106 may then make the uploaded available to one or more requesting machines or clients 108A-C.

Clients 108 may include user devices (mobile phones, laptops, desktop computers, or other processing or computing devices) that request access to the data that has been uploaded to shared server 106. In an embodiment, clients 108 may request access to the uploaded data or request that one or more queries 110 be executed against the data.

In an embodiment, query 110 may include one or more grouping parameters 112 by which the data of server 106 is to be grouped or aggregated. In an embodiment, grouping parameters 112 may indicate which aggregation request is being requested (e.g., summing, averaging, counting, etc.) and by which rows and/or columns the data is to be grouped and/or aggregated. An example query 110A is illustrated in FIG. 1C.

However, one of the problems with uploading data to the shared server 106 may be that the data may include sensitive or confidential data, and the shared server 106 may be a third-party or untrusted host. To prevent the data from being accidentally shared with an unintended party or to reduce its vulnerability to attack by malicious parties, host 104 may encrypt the dataset 102 prior to uploading the dataset 102 to shared server 106. Shared server 106 may then host encrypted dataset 105.

A general encryption scheme, such as advanced encryption standard (AES), may be applied to the data of a dataset before it is uploaded to a server. However, this type of AES encryption may prevent a data server (such as shared server 106) from performing operations to the encrypted data in response to query requests received from client machines.

This inability to read or execute operations on the hosted encrypted data may detrimentally effect the efficiency in both transmitting more data back and forth between clients and servers than would otherwise be necessary, and may also require extra resource and processing usage by the receiving machines or clients (e.g., 108) to perform the aggregations locally.

For example, rather than being able perform an aggregation in response to a query and return aggregated results to the requesting client, if AES is used to encrypt the data, the data server would have to send back the entire encrypted dataset which would require more transmission bandwidth and processing resources in both the sending and receiving of this larger dataset. For example, rather than returning an aggregated dataset as shown in FIG. 1D, the server would have to return the larger original dataset as shown in FIG. 1B.

Furthermore, the client would then have to use its own additional processing resources to perform the requested data aggregation, consuming processing resources that would have otherwise been available to other local processes or threads executing on the client device. And if multiple clients requested the same aggregation, each client device would be performing the same work, thus wasting system processing resources across multiple devices.

Using fully homomorphic encryption (FHE), instead of AES, to encrypt the data prior to uploading it to a server may enable the server execute some computations on the encrypted data and thus may be used to query data in an encrypted database. However, using FHE consumes larger amounts of processing power and too many computing cycles on the servers due to all the required overhead for FHE processing applications, and as such is too inefficient for practical, and time-sensitive and data analytic applications.

System 100 as described herein provides secure data aggregation in databases and solves both the bandwidth and efficiency problems of AES and the processing power and time delay problems of FHE. For example, system 100 of FIG. 1A may allow data aggregation in combination with grouping operations on encrypted dataset 105 without the problems described above with respect to AES and FHE.

In an embodiment, clients 108 may be executing one or more data analytic operations or applications. Data analytic applications or functionality often receive, execute, or request queries 110 to be executed against data hosted by a server. For example, a web analytics tool may determine the number of visitors of a website by country, browser, referrer, time, and other factors or attributes.

System 100 may enable shared server 106 to process these queries 110, including their grouping parameters 112, on encrypted dataset 105 and return an encrypted result without consuming large amounts of processing power (or at least by consuming less processing power, memory, and/or computing cycles than may otherwise be required to execute corresponding operations using FHE).

Furthermore, system 100 may also process the queries 110 without leaking or otherwise exposing grouping information that may be leaked using other encryption schemes. For example, as discussed in greater detail below, with other encryption and aggregation schemes, information about the grouping attributes and membership may be leaked during the aggregation. This leaked information could be exposed and used by hackers or other malicious users, creating a potential security threat.

FIG. 1B illustrates an example dataset 102A that will be used to illustrate the functionality of the system 100 for providing secured data aggregation, according to some example embodiments. The example dataset 102A includes five records with IDs 1-5, each with data values for each of a plurality of columns (ID, Salary, Gender, Name, Department).

FIG. 1C illustrates an example aggregation query 110A that may be used to illustrate the functionality of the system 100 for providing secured data aggregation, according to some example embodiments. In an embodiment, a client 108A may request, from shared server 106, that query 110A be executed against dataset 102A (of FIG. 1B). As discussed in greater detail below, dataset 102A may be encrypted by host 104 as encrypted dataset 105 before it is uploaded to shared server 106.

In the example of FIG. 1C, aggregation query 110A included a command to SUM (aggregate) the values of the Salary field of Table 102A. However, query 110A further indicates that not all the salary values should be added together. Instead, only those salaries for the sales department should be aggregated. Query 110A further indicates that the salaries should be grouped by gender. System 100 may be configured to provide encrypted data 105 to shared server 106 such that shared sever 106 is enabled to execute this query 110A against the encrypted data 105.

FIG. 1D illustrates an example result table 116 from executing query 110A against dataset 102A, according to an embodiment. Table 116 illustrates an example dataset or result table that may be returned to a client 108A requesting query 110A.

In an embodiment, host 104 may generate or receive aggregation query 110A (from FIG. 1C) prior to uploading dataset 102. Query 110A may, for example, be a known or often-requested query from clients 108. As such, host 104 may account for this query 110A as part of the encryption process prior to uploading dataset 102 to shared server 106 as encrypted dataset 105.

Based on query 110A, host 104 may identify value columns, group columns, and filter columns from dataset 102A. In the example dataset 102A, in view of query 110A, salary may be identified as being a value column which is to be aggregated (counted, averaged, or summed together), as indicated by the SUM clause. Gender may be identified as the group column (as indicated by the GROUPBY clause). And Department may be identified as a filter column (as indicated by the WHERE clause). These different clauses are examples of grouping params 112 of a query 110.

In different embodiments, as the values of the parameters 112 change, the various columns of dataset 102A may be differently identified. For example, with a different query, name may be a filter column, and department may be a group column. In other embodiments, a dataset may include multiple value, group, and/or filter columns.

As noted above, the dataset 102 may include sensitive or confidential data that is to be encrypted before it is uploaded to shared server 106. However, also as referenced above, to improve processing and reduce bandwidth consumption, the servers of shared server 106 may need to be able to aggregate the encrypted dataset 105 while still maintaining data security and preventing data leakages.

One approach to encryption may include using standard deterministic encryption. However, standard deterministic encryption always produces the same cipher text (e.g., encrypted data) for a given plaintext and key over separate executions of the encryption algorithm. This basic property-preserving feature of standard deterministic encryption may cause data leakage, enabling a hacker to determine that certain encrypted values belong to the same group. In an embodiment, encrypted data may require a decryption key to be decrypted, while encoded data may only require knowledge of the encoding algorithm to be decoded.

Figures 1E, 1F:
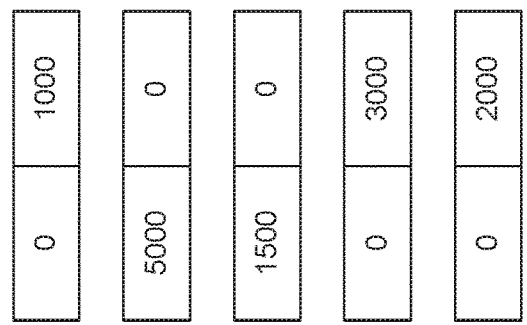

FIG. 1E illustrates a table 120 including an example deterministic encryption scheme as may be applied to the salary and gender columns of dataset 102A, according to an embodiment. For simplicity, the Name and Department columns have been omitted.

As illustrated by the (+) sign, additively homomorphic encryption scheme (AHES) may be used with the salary data (i.e., the values to be aggregated) of table 120. AHES may enable shared server 106 to calculate the encrypted sum of the cipher texts corresponding to plaintext values of table 102A. In the example of table 120, the salary column values may be encrypted using AHES, while the gender column (i.e., the groupby column) may be encrypted using simple deterministic encryption (E_Gender may refer to encrypted Gender). As a result, GroupBy operations can be evaluated on encrypted dataset 105 in exactly the same way as on plaintext data and subsequent data aggregation for each group can be evaluated by aggregating all AHES values.

While AHES may require more processing power than simple deterministic encryption (which does not have the additive functionality), using AHES may save bandwidth and client resources. For example, shared server 106 would no longer be required to return the entire encrypted dataset 105 to a client 108, but instead could return the encrypted aggregation result. Further, client 108 would not have to perform the aggregation using its own resources, but instead would only have to decrypt the aggregated result.

However, the problem with this approach is that the group membership (for the gender column) may still be leaked to a hacker or other adverse party who gains access to the data. As noted above, standard deterministic encryption produces the same cipher text for a given plaintext (value) and key. Thus, every encryption of "male" in the encrypted gender (E_Gender) will produce the same cipher text, and every encryption of "female" will produce the same cipher text.

For example, the plaintext "male" for the gender column of dataset 102A may produce the cipher text 1123F (in table 12). If the encrypted dataset 105 that is uploaded to the server 106 includes three 1123F values in the dataset, a hacker who gains access to the encrypted dataset 105 may then be able to determine that all of the records with 1123F in the Gender column belong to the same group.

Even if the hacker cannot determine that the cipher text 1123F corresponds to the "male" value, this data leakage may still present a security problem. The hacker would also know that the remaining records which include the female cipher text are also part of the same group, thus illustrating further data leakage. While the hacker may not be able to determine the values corresponding to male versus female, the hacker may be able to determine that rows 1, 4 and 5 share one value and belong to one group, while rows 2 and 3 share a different value and belong to another group.

Another strategy may be to pre-compute the aggregation results for all group column values during encryption and before the dataset 101 is uploaded to shared server 106. However, this approach limits the flexibility of additional filtering operations as may be specified in the WHERE clause of a query 110. Also, the storage overhead required to store an aggregated value for each possible combination of group columns increases exponentially.

Another strategy may be to replace the standard deterministic encryption (used on the male and female values for example) with searchable symmetric encryption (SSE) providing the same functionality. However, SSE only delays the disclosure or leakage of the same information creating the same security problems discussed above.

SSE may provide a semantic security for values that have not been yet been searched for or aggregated; however, after a search has been performed, similar security and leakage issues may still arise. For example, if SSE is used in table 120 instead of a standard deterministic encryption, then after an initial upload or outsourcing of data from a host 104 to shared server 106, a hacker or other unauthorized user can neither distinguish between the encrypted values of row 1 and row 2, nor can they tell that row 1 and row 4 include the same value (i.e., "male"). However, this is a temporary state of security that does not last beyond executing a query or aggregation on the encoded data.

In order to execute an aggregation operation with data that has been encrypted using SSE, a client or host generates a search token for SSE for each group value that the data is to be grouped by. The client or host then transfers this token to the server. This token enables the server to filter for the rows matching the group attribute (corresponding to the token), unveiling the identifiers of matching cipher texts. In some embodiments, this is called the access pattern.

With regard to the example table 120, if the gender data was encrypted with SSE instead of standard deterministic encryption, a token for Female and a token for Male may be generated and transferred to the server if the data of table 120 was encrypted. For example, a token T(F) may enable the server to search for female rows, while a different token T(M) may enable the server to search for male values in the gender column, which includes encrypted M and F attributes or values. Then, using the additive encryption for salary, the server can add the corresponding salary values, in the encrypted salary column. The search on T(F) returns rows 2 and 3, and the search of T(M) returns rows 1, 4, 5. The server can then aggregate the encrypted salary values for these rows respectively.

Even though the specific value searched for is hidden (e.g., male and female), the access pattern reveals the set of rows where the group column matches this searched value. And thus, this method leaks the same information as simple or standard deterministic encryption. Particularly, after query execution, it can be concluded that rows 2 and 3 contain the same group value, while rows 1, 4, 5 contain a different group value.

Static Shifting Embodiments

In an embodiment, system 100 may address this data leakage by examining (and combining) both value columns and grouping columns during an initial encryption stage. For example, using static shifting, host 104 may encode the group membership of the values into the cipher text of the values to be aggregated (using an offset). For example, the salary values could be encoded as belonging to either the male or female group.

In static shifting, the records of dataset 102A may be grouped based on one selected database attribute at a time. In an embodiment, an offset may be used to indicate the group membership (e.g., with regard to gender being either Male or Female). Then, the group membership offset may be combined with the values to be aggregated (Salary, as indicated by query 110A) and encrypted together. This may provide greater flexibility and security in query processing and prevent the data leakage described above.

Static shifting uses cipher text packing that may increase the performance of secure aggregation when applying additive encryption functionality by using less processing power and/or computing cycles. In an embodiment, the cipher text packing of static shifting may include dividing the plaintext (e.g., salary values) into several blocks (based on a group domain size) to allow for the encryption of multiple values in one single cipher text. The multiple values may indicate both the value of a value column (e.g., salary) as well as group membership (e.g., whether the salary corresponds to a male or female) as indicated by the GroupBy clause of a query 110A.

As described above, table 120 (of FIG. 1E) illustrates an example of how data of dataset 102A may be uploaded to a server without using cipher text packing of static shifting. Table 122 of FIG. 1F, by contrast, includes tuples that illustrate how the same data (as shown in FIG. 1E) may be packed and transmit or uploaded to the server using the cipher text packing of static shifting.

As illustrated in table 122, the left shifted values may indicate salaries corresponding to females, while the other values may indicate salaries corresponding to males. In an embodiment, host 104 may encrypt the tuples of table 122 with AHES (capable of additive functionality) and upload the data as encrypted dataset 105. The block size for each salary value may be two, because the gender domain may only include one of two values: male or female. In another embodiment, the number of blocks may be greater than the domain size of the group to increase security, however this may consume greater resources.

Host 104 may use cipher text packing, prior to uploading dataset 102 to shared server 106, to provide increased security and prevent the data leakages described above. Dataset 102 may have a value block with plaintext values from a value column (such as the salary values for the records). Host 104 may determine the largest plaintext value size and use that for a size of a block. Or, for example, a host may use a block of size 32 bits which corresponds to the general integer size. Thus, the cipher text packing may accommodate a large range of values. In other embodiments, different blocks sizes may be used for different values.

The group attribute for gender includes a domain of size 2, including values of Male and Female. In an embodiment, the offset values may include the constants 0 (or 1) and shift value of $2^{32}$ (for a block size of 32 bits). Host 104 may encode the following tuples (1000, male), (5000, F), (1500, F), (3000, M), (2000, M) as shown in table 122, where each block is 32 bits in length. Remaining (unfilled) blocks may be set to 0. While another constant (other than 0) may be used, this may require additional post-processing resources to unencrypt.

If a client 108 was to receive the encrypted and encoded tuple (6500, 0) or (0, 6000) from shared server 106 in response to an aggregation request or query grouped by gender, the client 108 may decrypt and decode the result to determine that the received tuples correspond to females with an aggregated salary of 6500, and males with an aggregated salary of 6000, respectively.

In an embodiment, host 104 may use a mapping function to map values based on the group attributes. In an embodiment, this may include a blockwise left shift (as shown in table 122). The mapping function may encode the group membership into or with the salary or other aggregated value. Then the encoded value (with group membership) may be encrypted using an additive encryption scheme, resulting in additive cipher text.

In an embodiment, when shared server 106 receives an aggregated query 110A, server 106 can execute the aggregation on the encrypted and encoded data 105 without decrypting or decoding the data. As just described, the client 108 can then decrypt and decode the result and extract the individual group results by extracting the corresponding value block.

For example, client 108 may receive the decryption key and generate or an inverse mapping function indicating the offset value or shift values of the received data. By sharing this decryption key and mapping function with client 108, host 104 does not need to transmit this information to shared server 106 to receive an aggregation result from encrypted dataset 105. Static shifting inherits the security properties of the additive (homomorphic) encryption, but also restricts leaking the group domain size. In an embodiment, the number of distinct group attribute values may be smaller than the max number of value blocks fitting in the plaintext domain.

Figure 2:
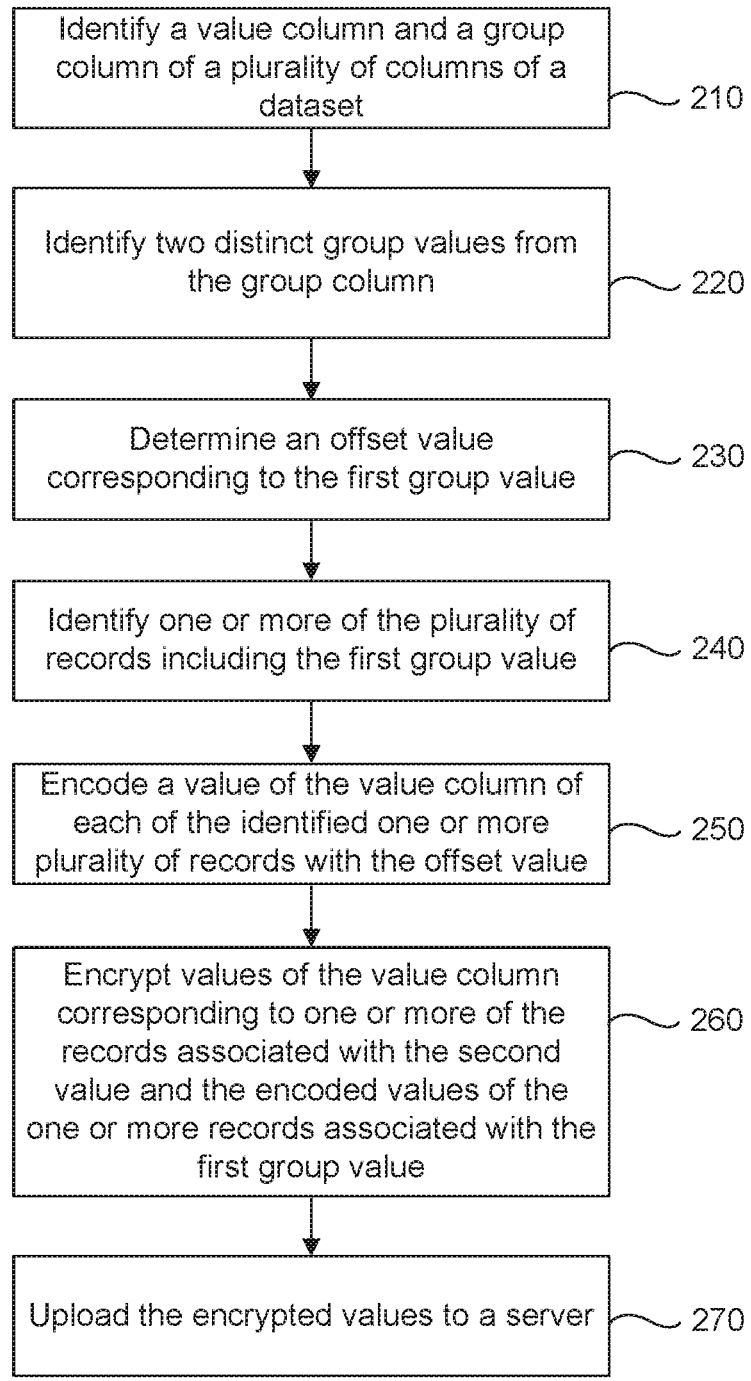
FIG. 2 is a flowchart illustrating example operations related to providing secured aggregation using static shifting, according to some embodiments.

FIG. 2 is a flowchart illustrating example operations related to providing secured aggregation using static shifting, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIGS. 1A-O. However, method 200 is not limited to the example embodiments.

In 210, a value column and a group column of a plurality of columns of a dataset are identified. For example, host 104 may identify salary as a value column of dataset 10A (FIG. 1B) to be aggregated, and gender as a group column by which the salary column is to be grouped based on query 110A (of FIG. 1C).

In 220, two distinct group values of the group column are identified. For example, host 104 may identify that the gender column (a group column) of dataset 102A includes a Male value and a Female value. In other embodiments, the group value may include more than two domain values. In another embodiment, a dataset 102 may include multiple group columns, each with two or more values.

In 230, an offset value corresponding to the first group value is determined. For example, encoded salary with the group value may include shifting the salary value by a particular offset as illustrated in FIG. 1F. In an embodiment, a first group (Male) may include an offset value of 0 (which may be achieved by multiplying the value by a factor 1), and a second group (Female) may include an offset value of $2^{32}$ (bits). In an embodiment, when the offset is 32 bits, the shift illustrated in FIG. 1F, may be achieved by multiplying the original value with $2^{32}$. For example, a value 3 is 0011 in a binary representation. Shifting 3 by 2 bits may be achieved by multiplying 3 by 4 ($2^2$). As such, 3*4=12 which is represented by 1100 in binary. In other embodiments, different offset values may be used.

In 240, one or more of the plurality of records, including the first group value, are identified. For example, host 104 may identify that records 2 and 3 of table 102A include a gender of Female. Host 104 may also identify that records 1, 4, and 5 include a gender value of Male.

In 250, a value of the value column of each of the identified records is encoded using the offset value. For example, as illustrated in FIG. 1F, host 104 may encode both female salaries 5000 and 1500 using the offset value (e.g., $2^{32}$) assigned to records with the Female attribute or group value. In an embodiment, this encoding may include multiplying the salary values by the offset values. FIG. 1F illustrates an example resulting dataset in which the salary values are encoded with their respective grouping offset values.

In 260, values of the value column corresponding to the records associated with the second group value, and the encoded values of the records associated with the first group value are encrypted. For example, host 104 may encrypt the encoded salary values illustrated in FIG. 1F. These encrypted encoded salary values may replace the two encrypted columns illustrated in FIG. 1E. In an embodiment, the encoded salary values may still be encrypted using an additive encryption scheme (as illustrated for the encrypted salary values (E_Salary) of FIG. 1E).

In 270, the encrypted values are uploaded to a server. For example, host 104 may transmit or otherwise make available encrypted dataset 105 to shared server 106. Shared server 106 may then receive and/or process queries 110 from one or more clients 108 on encrypted dataset 105. Clients 108 may receive the encrypted, encoded, and aggregated results, and then using tokens or keys decrypt and decode the results.

Shifted Bucketization Embodiments

As noted above, static shifting may use memory or other storage to store the zero values or other constant values. For example, the tuples of Table 122 may each include one or more zero or other constant values. While this encodes the salary values based on the grouping, this additional storage requirement for storing zeros or other constant values may become increasingly burdensome as the domain size grows and more salary values are to be stored.

The storage requirements of static shifting can be reduced by splitting the group domain into several buckets using shifted bucketization. Shifted bucketization may be particularly beneficial in reducing storage requirements if the dataset 102 is being grouped by multiple or group values out of one large value domain or column of possible group values.

In an embodiment, host 104 may perform shifted bucketization, during which dataset 102 is divided into one or more buckets. In an embodiment, each bucket may correspond to a set of values from a particular set of grouping attribute. Using shifting bucketization, values belonging to the same bucket may become indistinguishable to a hacker who may gain access to the uploaded, encrypted dataset 105 that has been bucketed. Or, for example, host 104 may preprocess these cipher texts such that the encrypted group membership can be combined with encrypted values during aggregation.

FIG. 1G illustrates an example dataset 102B that will be used to illustrate the functionality of the system of for providing secured data aggregation, according to some example embodiments. Table 102B shows that the same data (from table 102A of FIG. 1B) may be grouped by two or more columns. In the example of table 102B, one value column (Salary), and two group columns (Gender and Department) may be identified based on group parameters 112 of a query 110. In an embodiment, the static bucketization approach may not scale for group statements over multiple attributes. However, this grouping may be performed by interpreting the combination of multiple grouping values as one meta grouping value, but this may exponentially increase the grouping domain sizes.

FIG. 1H illustrates an example bucketization 124 of the dataset 102B based on the identified grouping columns. In an embodiment, because gender only includes a domain of size 2 (Male, Female), all of the records may fit into a single bucket (Gen 1). However, because Department includes a domain of size 3 (Sales, Finance, Facility), two buckets may be necessary to group all of the records (Dept 1, Dept 2), when a bucket size of 2 is used.

In an embodiment, the Sales and Finance values (from the Department column) may be grouped together to make it more difficult for a hacker to determine group membership (rather than having all the rows with "sales" as a Department value in one bucket, and then grouping "finance" and "facility" grouped together). In another embodiment, sales and facility may be grouped together into a single bucket, and finance could have had its own bucket.

FIG. 1I illustrates an example shifted bucketization 125 of the dataset 102B, according to an embodiment. In shifted bucketization 125, salary values may be bucketed in accordance with grouping bucketization 124 based on the department attribute.

In an embodiment, the bucketed and shift encoded values of 125 may then be encrypted with an additive encrypted scheme and uploaded by host 104 as encrypted dataset 105. In an embodiment, this encoding scheme can be seeded with another secret or client key, hiding the group values that are grouped or mapped to the same bucket, which may be performed by the host 104 prior to upload. In an embodiment, the bucket membership may be protected using searchable symmetric encryption (SSE) with support for Boolean search queries. This level of extra protection unveils the same bucket membership only for rows matching the additional filtering clause.

Figure 3:
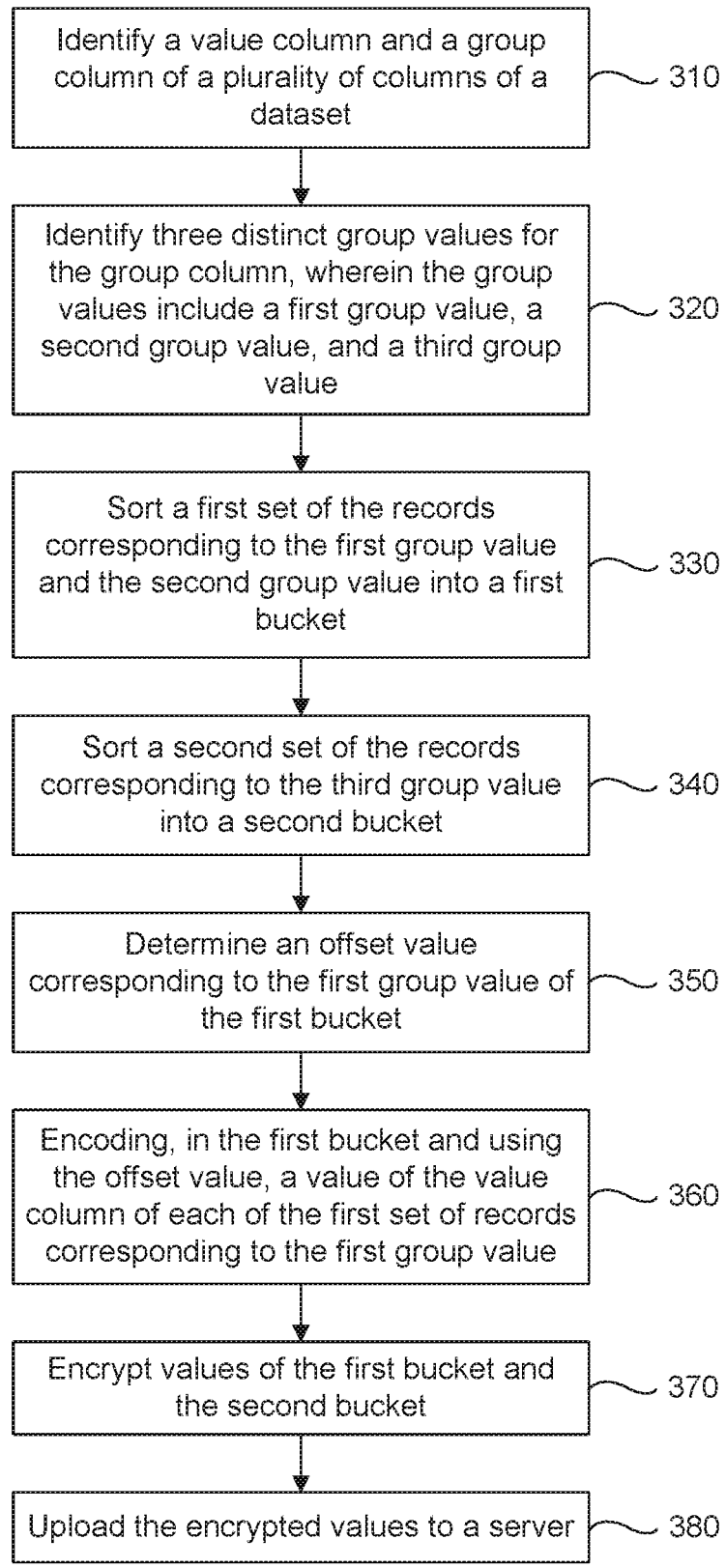
FIG. 3 is a flowchart illustrating example operations related to providing secured aggregation using shifted bucketization, according to some embodiments.

FIG. 3 is a flowchart illustrating example operations related to providing secured aggregation using shifted bucketization, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIGS. 1A-1O. However, method 300 is not limited to the example embodiments.

In 310, a value column and a group column of a plurality of columns of a dataset are identified. For example, host 104 may identify a value column (e.g., Salary) and at least one group column (e.g., Department) as shown in dataset 102B of FIG. 1G. In an embodiment, this identification of a group column may be responsive to processing a query 110 that includes a GROUPBY clause that indicates at least the department grouping. The GROUPBY clause may also indicate another group column, such as gender. In other embodiments, varying numbers of value columns and/or group columns may be processed as described herein.

In 320, three distinct group values for the group columns are identified, wherein the group values include a first group value, a second group value, and a third group value. For example, host 104 may identify that the department group includes a domain of three values: Sales, Finance, and Facility.

In 330, a first set of the records corresponding to the first group value and the second group value are sorted into a first bucket. For example, as shown in example table 124 of FIG. 1H, host 104 may determine that the records require two Department buckets because the domain column has a domain size of 3. In another embodiment, a different bucket size (other than 2) may be used for the buckets which would change the bucketization. In an embodiment, the Sales and Finance of bucket Dept 1 can be sorted into a first bucket 126A of FIG. 1L and the facilities row 5 can be sorted into a second bucket 126B. In an embodiment, host 104 may also identify that all the records of the gender grouping may fit into a single Gender bucket (of domain size 2).

In 350, a second set of the records corresponding to the third group value are sorted into a second bucket. For example, as illustrated in FIG. 1I, the facility record(s) may have their own bucket 126B, while the sales and finance records may be sorted into bucket 126A.

In 360, an offset value corresponding to the first group value of the first bucket is determined. In 370, a value of the value column of each of the first set of records, in the first bucket and using the offset value, corresponding to the first group value are encoded. For example, as illustrated in bucket 126A of FIG. 1I, distinguishing between sales and finance groupings may be determined based on the offsets. For example, the sales department salary values may be right shifted based on the offset.

In 380, values of the first bucket and the second bucket are encrypted. For example, host 104 may encrypt the values of each bucket 126A (including the offset salary values) and bucket 126B using an additive homomorphic encryption scheme.

In 380, the encrypted values are uploaded to a server. For example, host 104 may transmit or otherwise make available encrypted dataset 105 to cloud server provider 106. Shared server 106 may then receive and/or process queries 110 from one or more clients 108 on encrypted dataset 105. Clients 108 may receive the encoded, encrypted, and aggregated results, and then using tokens or keys decrypt and decode the results.

Dynamic Bucketization Embodiments

The shifted bucketization described above addresses secure aggregation protocols when a single value attribute is to be aggregated. While host 104 may apply shifted bucketization over and over again (for multiple values to be aggregated), the problem with this approach is that group membership is encoded in each value (to be aggregated) separately which results in storage of redundant information, and non-optimal storage utilization. In an embodiment, if there are multiple different value columns to be aggregated, then the bucketing can be done dynamically using dynamic bucketization.

To achieve better storage efficiency, host 104 may upload and/or store the value attributes and shift values (determined based on the grouping) separately on shared server 106. Then, for example, shared server 106 may multiply these values on the server 106 when queried. Since these shift values include sensitive information (i.e., indicating group membership), they may also be encrypted when stored. But the encryption scheme may enable at least one cipher text (encrypted value) multiplication.

In an embodiment, the multiplication of cipher texts can be achieved using somewhat homomorphic encryption (SWHE). In an embodiment, SWHE may support one multiplication between cipher text values and an additive property after the multiplication. In other embodiments, other types of encryption that support more functionality (such as multiplication multiple times) may be used. However, to do so would consume extra processing resources due to the extra processing overhead involved. Host 104 may encrypt both the value(s) to be aggregated (e.g., the salary) and the offset value with an encryption that enables multiplication of the cipher texts.

Host 104 may replace or encode a grouping value of a record with a substitute value, such as an offset value, which may increase security and provide dynamic shifting functionality. FIG. 1J illustrates an example table 128 in which group values are replaced, and values are encrypted separately. For example, the gender values may be replaced with an offset, and both the salary and offset values may be encrypted separately. To achieve better storage efficiency, host 104 may upload the value attributes (of the value columns) and the shift or offset values (of the group columns) as separate values. Then, for example, using the functionality provided by SWHE, the server may then multiply them when they are queried. Count queries can be supported by encrypting value attributes fixed to one (as shown with respect to the Male offset value).

In an embodiment, host 104 may execute a routine or algorithm that generates a key pair including an encryption key that is used to encrypt the plaintext into a cipher text, and a decryption key that may be used to decrypt a cipher text.

In an embodiment, host 104 may replace Gender (group values) with numeric values. In an embodiment, the numeric values may correspond to the shift values as described above. The numeric values may then be multiplied by value properties that are encrypted. Then, for example, host 104 may encrypt the numeric values representing the group.

The multiplication of cipher texts would produce a similar result described above with respect to FIG. 1F, however the values would be in cipher text. The aggregation may then produce a result similar to FIG. 1D, in cipher text. This cipher text, encoded, and encrypted result may then be returned to a client 108, which may then decrypt the result to the query. In an embodiment, the shift values and offsets and substitute values may be shared by host 104 with clients 108. However, to protect the data, the key values may not be shared with shared server 106 hosting encrypted dataset 105.

Figure 4:
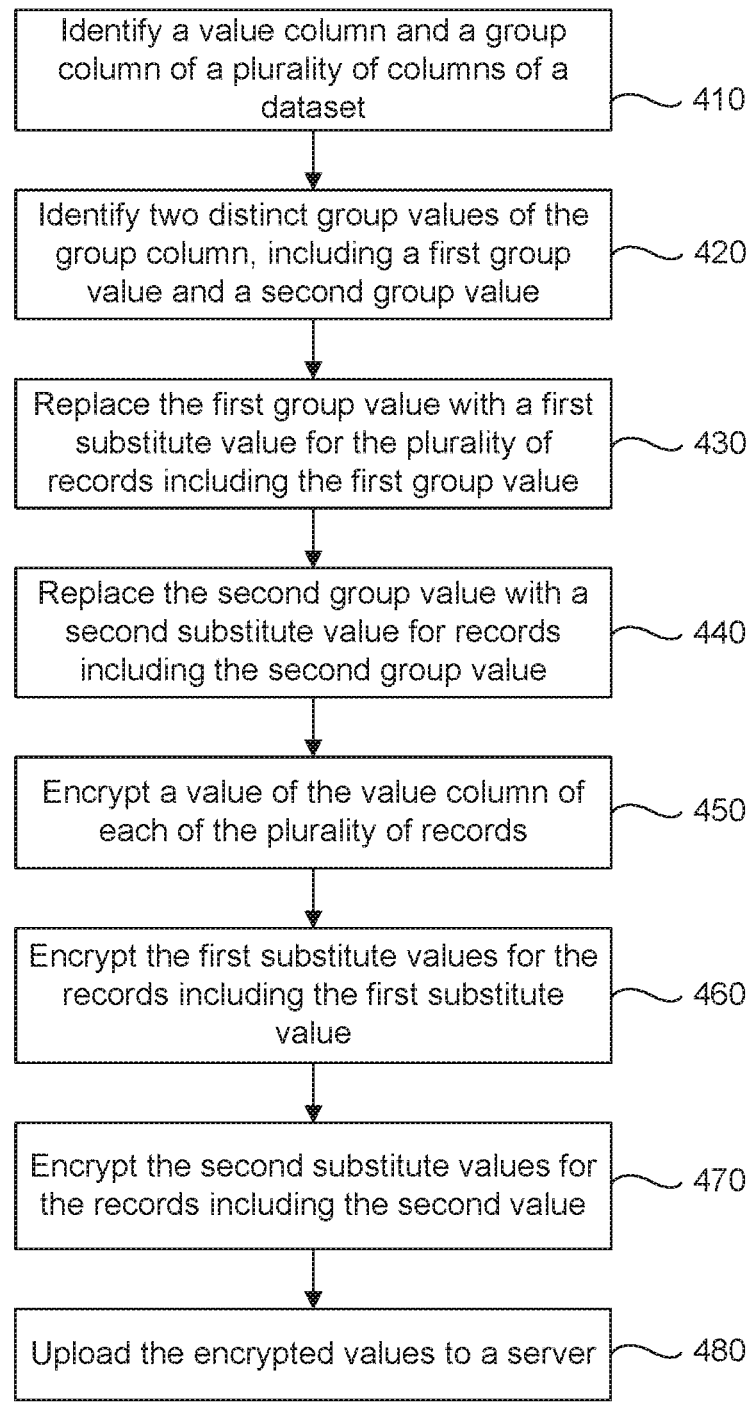
FIG. 4 is a flowchart illustrating example operations related to providing secured aggregation using dynamic bucketization, according to some embodiments.

FIG. 4 is a flowchart illustrating example operations related to providing secured aggregation using dynamic bucketization, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1A-1O. However, method 400 is not limited to the example embodiments.

In 410, a value column and a group column of a plurality of columns of a dataset are identified. For example, host 104 may identify a value column (salary) and a group column (gender) from a plurality of columns of a dataset 102A (of FIG. 1B).

In 420, two distinct group values of the group column, including a first group value and a second group value are identified. For example, host 104 may identify that gender has two distinct values in its domain: Male and Female.

In 430, the first group value is replaced with a first substitute value for the plurality of records including the first group value. For example, in table 128 (FIG. 1J), Male is replaced with the cipher text of 1, which may be output by a SWHE.

In 440, the second group value is replaced with a second substitute value for the records including the second group value. For example, in table 128 (of FIG. 1J), Female is replaced with $2^{32}$. In an embodiment, using substitute values enables the shared server 106 to combine values in group columns and value columns. Using substitute values may also increase security, as a potential hacker who gains access to encrypted dataset 105 would not know that I corresponds to Male and $2^{32}$ to female. In other embodiments, other substitute values may be used.

In 450, a value of the value column of each of the plurality of records is encrypted. For example, in table 128 (FIG. 1J), the salary values are encrypted with SWHE (e.g., additive and multiplicative encryption).

In 460, the first substitute values for the records including the first substitute value are encrypted. For example, in table 128 (FIG. 1J), the 1 value corresponding to male is encrypted with SWHE.

In 470, the second substitute values for the records including the second substitute value are encrypted. For example, in table 128 (FIG. 1J), the $2^{32}$ value corresponding to female is encrypted with SWHE.

In 480, the encrypted values are uploaded to a server. For example, host 104 may upload the encrypted dataset 105 to shared server 106. When an aggregation request is received from one or more clients 108, the server 106 may then multiply and add the encrypted values based on the requested aggregated, and return encrypted and encoded results to a client 108. Client 108 may then, using one or more keys, decode and de-encrypt the received result to receive the result of the query.

Grouping Bucketization Embodiments

In an embodiment, host 104 may use grouping bucketization to support GroupBy statements with multiple grouping attributes simultaneously in the same query. For example, as illustrated in FIG. 1G, rather than just performing grouping by either the Gender or Department columns, aggregation and grouping may be performed by both the Gender and Department columns simultaneously using grouping bucketization. In other example embodiments, different grouping columns may be used.

The exemplary bucketing illustrated in FIG. 1H may be used with respect to the columns by which the records are being group. In an embodiment, the membership for each row may be indexed using searchable symmetric encryption (SSE). Using SSE, rows belonging to a specific bucket may be determined using a token generated by a client 108 or host 104. For example, a token for identifying rows with a Department value="Sales" may be generated by a host 104 or client 108, and transmitted and executed by shared server 106. Using the token, shared server 106 could identify the rows with the "Sales" as the department value.

The underlying values of table 102B by which the data is to be grouped may be replaced with substitute values, which may increase security. For example, as noted above, the dataset 102B (FIG. 1G) may be grouped by both the gender and department columns. Host 104 may use a mapping function to replace the values of the dataset with substitute values prior to uploading the data to shared server 106, in order to increase security.

For example, the mapping function may replace the values in the dataset 102 with the following values: male=0, female=1 for the gender grouping column, and sales=0, finance=1 and facility=2 for the department grouping column. Then, for example, if a hacker gained access to a token for the value "1," the hacker could not determine to what underlying data (if any) the value "1" corresponds. The answer may vary depending on to which column the "1" corresponds to which bucket the respective records are bucketed.

Table 130 of FIG. 1K illustrates an example of the mapped values of table 102B of FIG. 1G being replaced with substitute values. In an embodiment, because sales and finance share one bucket, and facility has its own bucket, rather than using value 2, facility may be assigned value 0 for its own bucket (as indicated in row 5). If there was another domain value for Department, such as Technology, which shared a bucket with Facility, Technology may be assigned value 1 for the second bucket.

In an embodiment, to support grouping by both grouping attributes simultaneously (e.g., both the gender and department columns), host 104 may generate a product of the two identified grouping attributes using the substitute values (which may be in monomial form). The product of the grouping columns is illustrated in the column labeled E_Gender*E_Department.

As described above, an example of how to shift the Salary values based on the gender grouping is illustrated in FIG. 1F. FIG. 1L illustrates an example grouping bucketization of a combination of attribute values (gender and department). However, to encode the salary values within the buckets 132A, 132B, host 104 may map combinations of attribute values to the proper shifts or offsets.

FIG. 1M illustrates an example of how the shifts may be determined for combinations of group values, according to some embodiments. In the example of FIG. 1M, G1 may correspond to a first group value (Gender) and G2 may correspond to a second group value (Department). In the matrix 126, the substitute values for G1, G2, and the product of G1*G2 are illustrated as monomials. In an embodiment, these shifts can be used for both buckets 132A and 132B.

In matrix 126, a first record in a first bucket with G1=0 and G2=0 and G1*G2=0 may include the shift indicated by a0. However, a second record in a second bucket with G1=0 and G2=0 and G1*G2=0 may also include the shift indicated by a0. The system of shifted values or bits illustrated in section 134 may correspond to the indicated polynomial of matrix 126. For example, a record with values 0, 0, 0 and shift a0 may correspond to the offset=1, regardless of which bucket the record is located. As may be seen in table 130 of FIG. 1K, rows 1 and 4 both include 0, 0, 0 monomial grouping values and are aggregated in the first spot (with offset 1) of bucket 132A (1000+3000=4000). FIG. 1L illustrates an example resultant of how salary values may be bucketed and aggregated in accordance with the shift values and groupings of FIG. 1M. In an embodiment, the coefficients illustrated may be transferred from host 104 to server 106 in plaintext during the encryption phase.

FIG. 1N illustrates an example aggregation query 138, according to an embodiment. Query 138 requests an aggregation (sum) of salary values based on both gender and department. While query 138 indicates a sum of values, in other embodiments, other types of aggregation may be requested by a query, such as average, count, etc.

In an embodiment, client 108 may determine SSE tokens for buckets G1, D1, and D2 and send them to shared server 106 in addition to the identifier of the attribute Salary to be aggregated and the identifiers of the attributes Gender and Department by which the salary values of the records are to be grouped. Shared server 106 may use the tokens to determine the rows that belong to the different buckets. Then, by calculating the intersection of the resulting rows, shared server 106 may determine the rows that belong to the bucket combination.

In another embodiment, the SSE scheme may support Boolean queries and may be used to determine joint bucket membership without leaking bucket membership of individual attributes. In the example described above and illustrated in FIGS. 1K and 1L, the first four rows may belong to the same bucket combo (G1, D1), while the last row ID 5 may belong to the bucket combo (G1, D2). Shared server 106 may determine the encrypted shift for each row by evaluating the provided encrypted grouping monomial.

For example, shared server 106 may calculate the offsets or shifts of 134 (FIG. 1M) without knowing the underlying actual data values. As such, shared server 106 may determine that the polynomial evaluates to 1 for the first row (from table 130 of FIG. 1K), the second row evaluates to $2^{64}$ and so on. The result of the evaluation may be encoded (and additionally encrypted) as illustrated in FIG. 1L, in which the shift value is hidden in each bucket.

In an embodiment, the shift value may be encrypted. By using an encryption scheme that supports both multiplication and addition on cipher texts, shared server 106 may multiply the encrypted salary values by the encrypted shift produces the encrypted shifted value of FIG. 1L. The server may also aggregate (sum) the encrypted shifted values for each bucket combo separately and returns the result.

Clients 108 may receive the values illustrated in buckets 132A and 132B from shared server 106 in response to query 138. Clients 108 may have the necessary key information to decode and decrypt the result, to produce the exemplary plaintext table 140 illustrated in FIG. 1O. However, by only returning the encoded and encrypted data of FIG. 1L, the system described herein both preserves security (for sensitive and confidential data, avoiding data leakages) and minimizes the amount of bandwidth that would otherwise be necessary to individually transmit all the data of table 140 between shared server 106 and one or more clients 108 or host 104.

Figure 5:
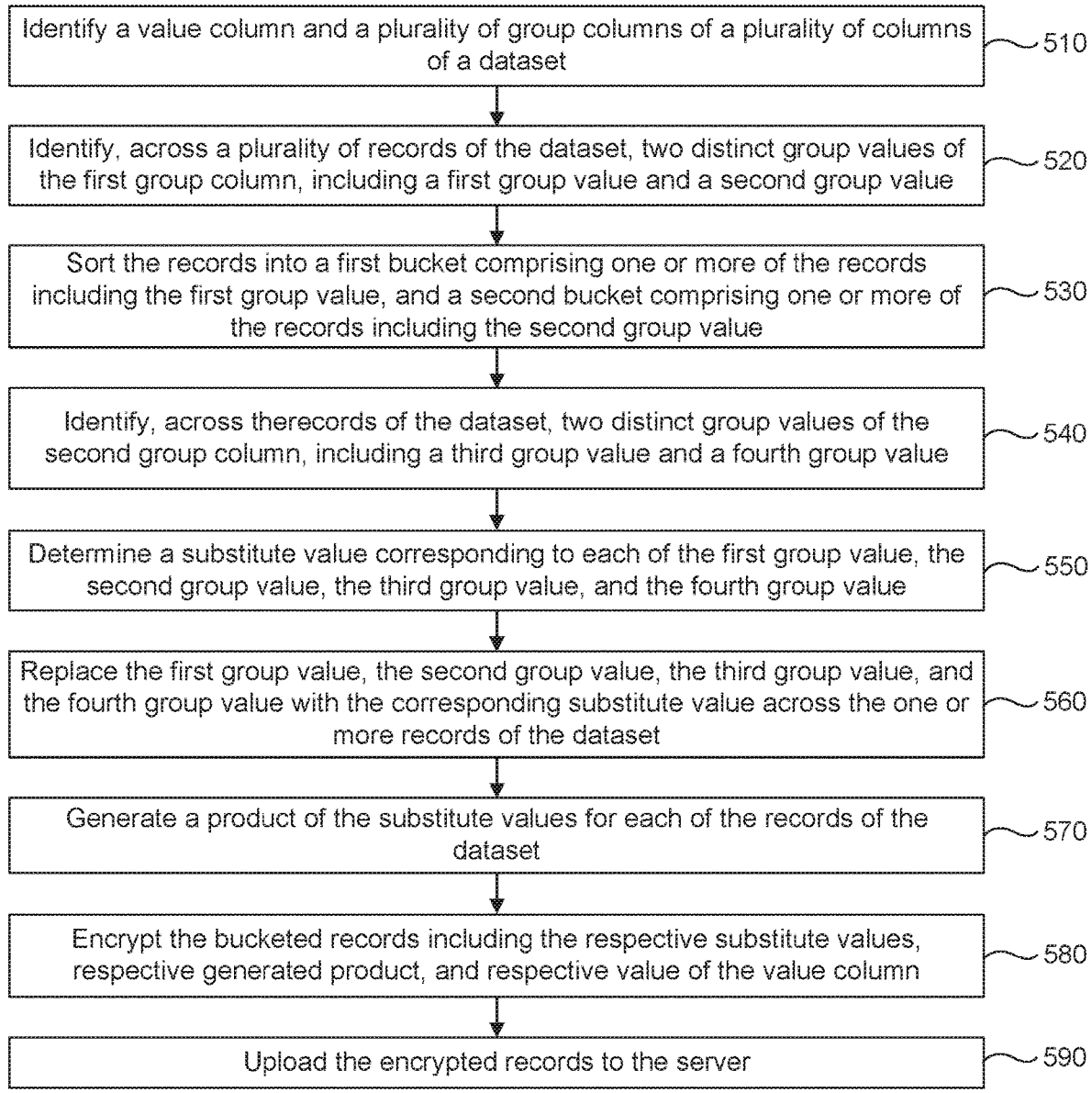
FIG. 5 is a flowchart illustrating example operations related to providing secured aggregation using grouping bucketization, according to some embodiments.

FIG. 5 is a flowchart illustrating example operations related to providing secured aggregation using grouping bucketization, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIGS. 1A-1O. However, method 500 is not limited to the example embodiments.

In 510, a value column and a plurality of group columns of a plurality of columns of a dataset are identified. For example, as illustrated in FIG. 1G, the value column to be aggregated (based on query 138 of FIG. 1N) is the Salary column. Query 138 may further indicate that the salaries are grouped by the gender and department columns. In an embodiment, multiple different values may be aggregated.

In 520, two distinct group values of the first group column, including a first group value and a second group value, are identified across a plurality of records of the dataset. For example, the department column of table 102B (FIG. 1G) includes a domain of three values: sales, finance, and facility.

In 530, the records are sorted into a first group comprising one or more of the records including the first group value, and a second group comprising one or more of the records including the second group value. For example, as illustrated in FIG. 1H, the rows may be bucketed based on the values of columns by which the records are to be grouped.

In 540, two distinct group values of the second group column, including a third group value and a fourth group value, are identified across the records of the dataset. For example, the gender column of table 102B (of FIG. 1G) includes a domain of two values: male and female.

In 550, substitute values corresponding to each of the first group value, the second group value, the third group value, and the fourth group value are determined. For example, a mapping function may be used to determine substitute values for each of the values of the domains or columns by which salary is to be aggregated (as illustrated in table 102B of FIG. 1G, and corresponding table 130 of FIG. 1K showing the substituted values).

In 560, each of the first group value, the second group value, the third group value, and the fourth group value are replaced with the corresponding substitute value across the one or more records of the dataset. For example, as illustrated in FIG. 1K, the gender value male is replaced with 0, and the gender value female is replaced with 1. Furthermore, the department value for sales for bucket 1 is replaced with 0, the department value for finance for bucket 1 is replaced with 1, and the department value for facility for bucket 2 is replaced with 0.

In 570, a product of the substitute values for each of the records of the dataset is generated. For example, as illustrated in the matrix 126 of FIG. 1M and the table 130 of FIG. 1K, a product for the group membership is generated. The product may enable the server to determine combination group memberships (e.g., records that include specified values for both the first grouping column (gender) and the second grouping column (department) simultaneously).

In 580, the bucketed records including the respective substitute values, respective generated product, and respective value of the value column are encrypted. For example, as illustrated in table 130 of FIG. 1K, the substituted values are encrypted. As indicated by the (+) and (×) signs, the encryption scheme used to encrypt the values may enable shared server 106 to perform both multiplication and addition on the encrypted values.

In 590, the encrypted records are uploaded to the server. For example, host 104 may upload the transformed dataset 102 as encrypted dataset 105 to shared server 106. In an embodiment, the encrypted dataset is illustrated as table 130 of FIG. 1K. In an embodiment, polynomial coefficients may be uploaded to the server 106 as well. For example, host 104 may upload the corresponding values of section 134 (FIG. 1M) to shared server 106. In an embodiment, the offset value may be calculated based on the polynomial coefficients, as illustrated in section 134 of FIG. 1M.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
identifying a value column and a group column of a plurality of columns of a dataset, wherein the dataset comprises a plurality of records;
identifying two distinct group values of the group column, including a first group value and a second group value;
determining a first offset value corresponding to the first group value;
replacing the first group value with a first offset value for one or more of the plurality of records including the first group value;
determining a second offset value corresponding to the second group value, wherein the second offset value is different from the first offset value;
replacing the second group value with a second offset value for one or more of the plurality of records including the second group value;
encrypting a value of the value column of each of the plurality of records;
encrypting the first substitute values for the each of the plurality of records including the first substitute value;
encrypting the second substitute values for the each of the plurality of records including the second substitute value; and
uploading the plurality of records to a server, wherein each of the uploaded records comprise at least the encrypted value, and at least one of the encrypted first substitute value or the encrypted second substitute value.

2. The method of claim 1, wherein the encrypting the first substitute value comprises:
determining that the encryption of a value of a particular one of the plurality of records is compatible with the encryption of the first substitute value.

3. The method of claim 2, wherein the compatibility enables multiplying the encrypted value of the particular record with the encrypted first substitute value to produce an encrypted result.

4. The method of claim 3, further comprising:
requesting, from the server, an aggregation of the uploaded encrypted values based on the first and second group values, wherein as part of the aggregation, the first group value of the particular record is multiplied by the encrypted first substitute value to produce the encrypted result.

5. The method of claim 4, further comprising:
receiving, responsive to the requesting, the encrypted result; and
decrypting the encrypted result.

6. The method of claim 1, wherein the encrypting the value comprises:
determining an additive encryption scheme that enables the server to aggregate the encrypted values; and
encrypting the values of the value column using the additive encryption scheme.

7. A computer-implemented method, comprising:
identifying a value column and a plurality of group columns of a plurality of columns of a dataset, wherein the plurality of group columns includes at least a first group column and a second group column;
identifying, across a plurality of records of the dataset, two distinct group values of the first group column, including a first group value and a second group value;
sorting the plurality of records into a first bucket comprising one or more of the records including the first group value, and a second bucket comprising one or more of the records including the second group value;
identifying, across the plurality of records of the dataset, two distinct group values of the second group column, including a third group value and a fourth group value;
determining a substitute value corresponding to each of the first group value, the second group value, the third group value, and the fourth group value;
replacing the first group value, the second group value, the third group value, and the fourth group value with the corresponding substitute value across the one or more records of the dataset;
generating a product of the substitute values for each of the one or more records of the dataset;
determining an offset corresponding to the product;
encrypting the bucketed records including the respective substitute values, respective generated product, and respective value of the value column; and
uploading the offset to a server;
uploading the encrypted records to the server, wherein the server is configured to aggregate the encrypted value column of the respective records based on the first group column, the second group column, and a combination of both the first group column and the second group column; and
requesting, from the server, an aggregation of the uploaded encrypted values based on the first and second group values, wherein as part of the aggregation, the first group value of the particular record is multiplied by the encrypted first substitute value to produce the encrypted result.

8. The method of claim 7, wherein the substitute value corresponding to the first group value and the substitute value corresponding to the third group value are a same value.

9. The method of claim 8, wherein the substitute value corresponding to the second group value and the substitute value corresponding to the fourth group value are a same value.

10. The method of claim 9, wherein the substitute value corresponding to the first group value is distinguishable from the substitute value corresponding to the second group value.

11. The method of claim 9, wherein the sorting comprises:
determining a maximum bucket size of two, wherein the first group value and the second group value are associated with the first bucket and wherein the third group value and the fourth group value are associated with the second bucket.

12. The method of claim 7, wherein the encrypting comprises:
determining an encrypting scheme that includes both multiplicative and additive functionality on a generated ciphertext; and
encrypting the bucketed records based on the determined encryption scheme.

13. The method of claim 7, further comprising:
receiving, responsive to the requesting, an encrypted and encoded result;
decoding the encrypted and encoded result; and
decrypting the decoded and encrypted result.

14. A system, comprising:
a memory; and
at least one processor coupled to the memory and configured to:

identify a value column and a group column of a plurality of columns of a dataset, wherein the dataset comprises a plurality of records;

identify, across the plurality of records, two distinct group values of the group column, including a first group value and a second group value;

replace the first group value with a first substitute value for one or more of the plurality of records including the first group value;

replace the second group value with a second substitute value for one or more of the plurality of records including the second group value;

encrypt a value of the value column of each of the plurality of records;

encrypt the first substitute values for the each of the plurality of records including the first substitute value;

encrypt the second substitute values for the each of the plurality of records including the second substitute value; and upload the plurality of records to a server, wherein each of the uploaded records comprise at least the encrypted value, and at least one of the encrypted first substitute value or the encrypted second substitute value; and requesting, from the server, an aggregation of the uploaded encrypted values based on the first and second group values, wherein as part of the aggregation, the first group value of the particular record is multiplied by the encrypted first substitute value to produce the encrypted result.

15. The system of claim 14, wherein the processor that replaces the first group value is configured to:
determine a first offset value corresponding to the first group value; and
replace the first group value with the first offset value.

16. The system of claim 15, wherein the processor that replaces the second group value is configured to:
determine a second offset value corresponding to the second group value, wherein the second offset value is different from the first offset value; and
replace the second group value with the second offset value.

17. The system of claim 14, wherein the processor that encrypts the first substitute value is configured to:
determine that the encryption of the value of a particular one of the plurality of records is compatible with the encryption of the first substitute value.

* * * * *